United States Patent Office 3,062,818
Patented Nov. 6, 1962

3,062,818
HALOALKYL-s-TRIAZINES AND A NEW
METHOD OF PREPARATION
Frederic C. Schaefer, Darien, and Joseph H. Ross, Stamford, Conn., assignors to American Cyanamid Company, New York, N.Y., a corporation of Maine
No Drawing. Filed Nov. 10, 1960, Ser. No. 68,369
8 Claims. (Cl. 260—248)

This invention relates to novel haloalkyl-s-triazines and to a method for preparing the same. More particularly, it relates to novel monohaloalkyl-s-triazines of the formula:

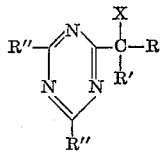

in which X is a halogen atom either bromine or chlorine, R and R' are each hydrogen or a lower alkyl radical having from one to four carbon atoms and R" is a lower alkyl radical having from one to four carbon atoms.

It is known that 2-haloethyl-4,6-diphenyl-s-triazines may be obtained by the halogenation of 2-ethyl-4,6-diphenyl-s-triazine. See H. Reinhardt and S. Schiefer, Chem. Ber. 90, 2643 (1957). However, in view of the fact that the phenyl radical is found at both the 4- and 6-positions of the triazine nucleus in the reactant employed by Reinhardt and Schiefer, the problem of preparing a monohaloalkyl-s-triazine was not as serious as that posed when substituents capable of being halogenated are also found in the 4- and 6-positions.

It has now been discovered that 2,4,6-trialkyl-s-triazines may be reacted with free halogen so as to selectively prepare 2-monohaloalkyl-4,6-dialkyl-s-triazines wherein the halogen atom is substituted on the 1- or alpha carbon of the alkyl chain in good yields. That 2,4,6-trialkyl-s-triazines might be selectively halogenated is surprising in view of the fact that random reaction of halogen with substituents in the 4- and 6-positions of the s-triazine nucleus is possible. It is further unexpected in view of the fact that other heterocycles, e.g. α-picoline and α-methyl quinoline, give polyhalogenated rather than monohalogenated products when treated with halogen.

Selective halogenation is accomplished by reacting a 2,4,6-trialkyl-s-triazine with free halogen in an inert reaction medium so as to obtain a 2-monohaloalkyl-4,6-dialkyl-s-triazine product in good yields. The product is then isolated from the reaction mass by conventional methods of separation, e.g. distillation, crystallization and filtration and the like. Subsequent regeneration and recycling of the hydrohalide salt of the 2,4,6-trialkyl-s-triazine improves the over-all yield of the 2-monohaloalkyl-s-triazine product.

The process of the present invention affords additional definite advantages over an alternative method of halogenation, i.e. use of a halogenating agent such as N-bromosuccinimide or N-chlorosuccinimide, in that undesirable side reactions which have been observed to take place when employing either of these halogenating agents are avoided. Moreover, only fair to moderate yields are obtainable by the use of N-bromosuccinimide and N-chlorosuccinimide. Furthermore, in attempts to recover 2-monohaloalkyl-s-triazine products from the reaction mixture, very frequently decomposition of the by-products which are formed takes place thereby rendering the over-all reaction difficult to control.

Among the many 2,4,6-trialkyl-s-triazines having from one to four carbon atoms in the alkyl grouping which may be employed there may be mentioned the following: 2,4,6-trimethyl-s-triazine, 2,4,6-triethyl-s-triazine, 2,4,6-tripropyl-s-triazine, 2,4,6-triisopropyl-s-triazine, 2,4,6-tributyl-s-triazine, 2,4,6-triisobutyl-s-triazine, 2,4-dimethyl-6-ethyl-s-triazine, 2,4-dimethyl-6-isopropyl-s-triazine and the like.

By the term "free halogen" as used herein is meant elemental bromine or chlorine. The amount of free halogen employed in the process is about an equimolecular quantity of the 2,4,6-trialkyl-s-triazine reactant. In some cases it is advantageous to employ about one-half mole of free halogen for each mole of 2,4,6-trialkyl-s-triazine. However, while no particular advantage is usually seen from using more than about equimolecular quantities of the reactants, it is generally preferable to employ very slight excess of s-triazine.

The reaction may be conducted at room temperature or above in the presence of a non-polar or polar solvent. While temperatures up to and slightly above 100° C. may be employed, no noticeable improvement in the over-all yield of the process is achieved thereby. Usually, however, temperatures between about 30° and about 80° C. are employed and are preferred.

Suitable non-polar solvents which may be employed as the inert reaction medium are carbon tetrachloride, chloroform, ethylenedichloride and the like. Of these, carbon tetrachloride is preferred. Suitable polar solvents which may be used as the inert reaction medium are acetic acid, trifluoroacetic acid and the like.

The 2-haloalkyl-4,6-dialkyl-s-triazine product may be recovered by conventional methods such as distillation, crystallization and filtration and the like.

The process is simply conducted by introducing free halogen into a solution of the 2,4,6-trialkyl-s-triazine for a period of time ranging from about 0.5 to about 3.0 hours. It should be mentioned, of course, that the time of reaction is dependent upon the reaction temperature as well as the rate of flow of free halogen into the reactant solution.

The compounds prepared by the process of the present invention are valuable intermediates in the preparation of other substituted-s-triazines, for example, the dithiophosphate derivatives which are extremely useful insecticides. Moreover, the monohaloalkyl-s-triazines are useful in the preparation of vinyl-s-triazines which can form useful polymers. Additionally, the compounds of the present invention possess herbicidal and nematocidal activity rendering them of use in agricultural applications.

In order to illustrate the present invention but not to limit it thereto, the following examples are given:

EXAMPLE 1

*Preparation of 2-Bromomethyl-4,6-Dimethyl-s-Triazine*

12.3 grams (0.1 mole) of trimethyl-s-triazine dissolved in 100 ml. of acetic acid are placed in a suitable reaction vessel equipped with a gas inlet, thermometer and reflux condenser carrying a calcium chloride drying tube. 5.2 ml. (0.1 mole) of bromine are added over a period of 20 minutes while maintaining the temperature of the reaction mixture at 35–40° C. The reaction mixture is treated with an excess of aqueous potassium carbonate solution and extracted with ether. The extract which is dried and distilled affords a good yield of product B.P. 93–95° C. (10 mm.), 73° C. (1.7 mm.), $N_D^{26}$ 1.5290–1.5300. *Analysis.*—Calculated for $C_6H_8BrN_3$: C, 35.66; H, 3.99; Br, 39.55; N, 20.80. Found: C, 35.46, 35.47; H, 4.00, 4.15; Br, 39.70, 39.78; N, 20.86, 20.99.

EXAMPLE 2

*Preparation of 2(1-Chloroethyl)-4,6-Diethyl-s-Triazine*

Into a suitable reaction vessel are introduced 16.5 grams (0.1 mole) of triethyl-s-triazine and 30 ml. of carbon tetrachloride. The solution is heated to about 60°

C. and with stirring 7 grams (0.1 mole) of chlorine are bubbled into the solution. Cooling of the reaction mixture, washing with potassium carbonate, filtration and subsequent distillation affords a good yield of product 9.7 grams, B.P. 74–76° C. (1 mm.), $N_D^{25}$ 1.4848. Vapor phase chromatography on silicone grease at 168° C. indicates a homogeneous material, which is identified by mass spectrometry and nuclear magnetic resonance spectroscopy.

EXAMPLE 3

*Preparation of 2(1-Bromoethyl)-4,6-Diethyl-s-Triazine*

(a) 330 grams (2 moles) of triethyl-s-triazine and 500 ml. of carbon tetrachloride are placed in a 3-neck flask equipped with dropping funnel, stirrer, reflux condenser with calcium chloride drying tube and thermometer. While maintaining the temperature of the solution at 60–65° C., 52 ml. (1 mole) of bromine are added with stirring. Cooling, washing of the reaction mixture with potassium carbonate, drying and distillation affords a good yield of product, B.P. 98–100° C. (4 mm.), $N_D^{25}$ 1.5066, whose analysis is confirmed by infrared examination and nuclear magnetic resonance spectroscopy.

(b) In the apparatus in (a), 165 grams (1 mole) of triethyl-s-triazine in 500 ml. of chloroform are reacted with 52 ml. of bromine (1 mole). Treatment as in (a) affords 119 grams of 2-(1-bromoethyl)-4,6-diethyl-s-triazine, B.P. 92° C. (1.5 mm.), $N_D^{25}$ 1.4770, representing a 60% yield based upon unrecovered triethyl-s-triazine. *Analysis.*—Calculated for $C_9H_{14}BN_3$: C, 44.27; H, 5.78; B, 32.73; N, 17.21. Found: C, 44.31; H, 5.97; B, 32.79; N, 17.48.

When other 2,4,6-trialkyl-s-triazines having from one to four carbon atoms in the alkyl grouping are reacted in essentially the same manner with bromine or chlorine similar results are obtained.

As indicated above, the compounds prepared in accordance with the process of the present invention possess herbicidal and nematocidal activity. The data in the following tables illustrates this activity (all percentages given as percent by weight).

Referring to Table I above, a water mixture of the percentage indicated therein of each of the compounds, prepared according to the process of the present invention, is prepared and seeds of each species, representing monocotyledonous and dicotyledonous plants, are admixed therewith for a twenty-hour period. After this period the seeds are washed and are held in a high humidity atmosphere for a five day germination period before the percent seed mortality is recorded.

Referring to Table II above, a water mixture of 0.1% of each of the compounds, prepared according to the process of the present invention, is prepared and nematodes admixed therewith for a twenty hour period. Immediately thereafter percent mortality is recorded.

Obviously the compounds of the present invention manifest varying degrees of herbicidal and nematocidal activity and the above illustrations are merely typical. Significantly, however, 2-chloroethyl-4,6-diphenyl-s-triazine failed to demonstrate comparable herbicidal and nematocidal activity when subjected to similar tests.

Moreover, when applied as a spray to foliage (pea seedlings, wheat seedlings, radish seedlings and tomato seedlings) at a level of 12.5 pounds/acre, 2-bromomethyl-4,6-dimethyl-s-triazine also demonstrated significant herbicidal activity.

We claim:

1. A compound of the formula

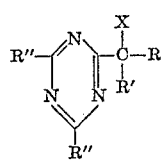

in which X is a halogen atom selected from the group consisting of bromine and chlorine, R and R' are each selected from the group consisting of hydrogen and lower alkyl having from one to four carbon atoms and R" is selected from the group consisting of lower alkyl having from one to four carbon atoms.

2. 2-bromomethyl-4,6-dimethyl-s-triazine.

3. 2-chloroethyl-4,6-diethyl-s-triazine.

| | Table I Herbicidal Activity, Percent Seed Mortality | | | | Table II Nematocidal Activity, Percent Mortality Vinegar eelworm (Anguilla sp.), Conc. |
|---|---|---|---|---|---|
| | Wheat Seeds, Conc. | | Radish Seeds, Conc. | | |
| | 0.1 | 0.01 | 0.1 | 0.01 | 0.1 |
| CH₃—[triazine]—CH₂Cl, CH₃ | 100 | 70 | 100 | 6 | 80 |
| C₂H₅—[triazine]—CHBrCH₃, C₂H₅ | 100 | 0 | 66 | 0 | 0 |
| C₂H₅—[triazine]—CHClCH₃, C₂H₅ | 32 | -------- | 2 | -------- | 0 |
| φ—[triazine]—CHClCH₃, φ | 0 | -------- | 0 | -------- | 0 |

4. 2-bromoethyl-4,6-diethyl-s-triazine.
5. A method for preparing a compound of the formula:

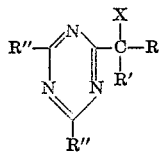

in which X is a halogen atom selected from the group consisting of bromine and chlorine, R and R' are each selected from the group consisting of hydrogen and lower alkyl having from one to four carbon atoms, and R" is selected from the group consisting of lower alkyl having from one to four carbon atoms, which comprises reacting a compound of the formula:

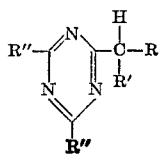

in which R, R' and R" are as defined hereinabove, with free halogen selected from the group consisting of chlorine and bromine at a temperature of from about 20° C. to about 100° C. in an inert reaction medium and recovering resultant product.

6. Method for preparing 2-bromomethyl-4,6-dimethyl-s-triazine which comprises reacting 2,4,6-trimethyl-s-triazine with bromine at a temperature of from about 20° C. to about 100° C. in an inert reaction medium and recovering resultant product.

7. A method for preparing 2-chloroethyl-4,6-diethyl-s-triazine which comprises reacting 2,4,6-triethyl-s-triazine with chlorine at a temperature of from about 20° C. to about 100° C. in an inert reaction medium and recovering resultant product.

8. A method for preparing 2-bromoethyl-4,6-diethyl-s-triazine which comprises reacting 2,4,6-triethyl-s-triazine with bromine at a temperature of from about 20° C. to about 100° C. in an inert reaction medium and recovering resultant product.

References Cited in the file of this patent
UNITED STATES PATENTS 2,845,422    Schaefer et al. _____ July 29, 1958

OTHER REFERENCES

Grundmann et al.: Ann. 577, 77 (1952).
Reinhardt et al.: Chem. Ber., 90, 2643 (1957).

UNITED STATES PATENT OFFICE
CERTIFICATE OF CORRECTION

Patent No. 3,062,818                                          November 6, 1962

Frederic C. Schaefer et al.

It is hereby certified that error appears in the above numbered patent requiring correction and that the said Letters Patent should read as corrected below.

Columns 3 and 4, in the table, the first structural formula should appear as shown below instead of as in the patent:

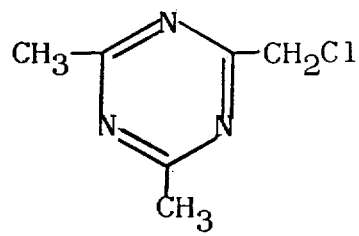

same table, the entry under "Radish Seeds, Conc. 0.01", for "6" read -- 26 --.

Signed and sealed this 12th day of May 1964.

(SEAL)
Attest:

ERNEST W. SWIDER                                         EDWARD J. BRENNER
Attesting Officer                                      Commissioner of Patents